US009705110B2

(12) United States Patent
Hatta et al.

(10) Patent No.: US 9,705,110 B2
(45) **Date of Patent: *Jul. 11, 2017**

(54) CELL

(71) Applicant: Sony Corporation, Tokyo (JP)

(72) Inventors: Kazuhito Hatta, Fukushima (JP); Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,715

(22) Filed: Nov. 18, 2016

(65) Prior Publication Data

US 2017/0069882 A1 Mar. 9, 2017

Related U.S. Application Data

(63) Continuation of application No. 14/870,703, filed on Sep. 30, 2015, which is a continuation of application (Continued)

(30) Foreign Application Priority Data

Dec. 10, 2004 (JP) ................................ 2004-357820

(51) Int. Cl.
*H01M 2/20* (2006.01)
*H01M 2/02* (2006.01)
(Continued)

(52) U.S. Cl.
CPC ........... *H01M 2/0287* (2013.01); *B29C 65/02* (2013.01); *B29C 65/08* (2013.01); *B29C 66/41* (2013.01);
(Continued)

(58) Field of Classification Search
CPC .... H01M 2/021; H01M 4/13; H01M 10/0431; H01M 10/052; H01M 10/0525; H01M 10/0565; H01M 10/0587; B32B 15/20
See application file for complete search history.

(56) References Cited

U.S. PATENT DOCUMENTS 3,081,371 A 3/1963 Toda et al.
4,022,951 A 5/1977 McDowall
(Continued)

FOREIGN PATENT DOCUMENTS

JP 2000-348695 A 12/2000
JP 2004-111303 A 4/2004
(Continued)

*Primary Examiner* — Mark F Huff
*Assistant Examiner* — Monique Wills
(74) *Attorney, Agent, or Firm* — K&L Gates LLP

(57) ABSTRACT

A cell is provided. The cell includes a cell element including a positive electrode, a negative electrode, an electrolyte and a laminate film including an exterior layer, a metal layer, an interior layer, and a welded layer formed of the interior layer; wherein a thickness of the welded layer is larger than 5 μm in a flat portion of the interior layer, wherein the welded layer increases in thickness from the flat portion to an end portion of the welded layer, and wherein when a thickness of the laminate film is t, a thickness of the interior layer is p and a thickness of the laminate film in the welded layer is t1, a following equation is satisfied: $t\times2-p\times2+5<t1<t\times2-5$ (μm).

19 Claims, 6 Drawing Sheets

Related U.S. Application Data

No. 14/334,208, filed on Jul. 17, 2014, now Pat. No. 9,178,186, which is a continuation of application No. 13/549,116, filed on Jul. 13, 2012, now Pat. No. 8,871,383, which is a continuation of application No. 11/289,191, filed on Nov. 29, 2005, now Pat. No. 8,263,256.

(51) Int. Cl.

| | |
|---|---|
| ***B32B 27/34*** | (2006.01) |
| ***B32B 27/36*** | (2006.01) |
| ***B32B 15/20*** | (2006.01) |
| ***B32B 15/085*** | (2006.01) |
| ***B32B 27/32*** | (2006.01) |
| ***B32B 5/14*** | (2006.01) |
| ***B32B 7/12*** | (2006.01) |
| ***B29C 65/08*** | (2006.01) |
| ***B29C 65/02*** | (2006.01) |
| ***B29C 65/00*** | (2006.01) |
| ***B32B 15/088*** | (2006.01) |
| ***B32B 15/09*** | (2006.01) |
| ***H01M 10/04*** | (2006.01) |
| ***H01M 2/08*** | (2006.01) |
| ***H01M 2/16*** | (2006.01) |
| ***H01M 10/0587*** | (2010.01) |
| *B29K 655/00* | (2006.01) |
| *B29L 31/00* | (2006.01) |

(52) U.S. Cl.

CPC .............. *B29C 66/71* (2013.01); *B32B 5/142* (2013.01); *B32B 7/12* (2013.01); *B32B 15/085* (2013.01); *B32B 15/088* (2013.01); *B32B 15/09* (2013.01); *B32B 15/20* (2013.01); *B32B 27/32* (2013.01); *B32B 27/34* (2013.01); *B32B 27/36* (2013.01); *H01M 2/021* (2013.01); *H01M 2/026* (2013.01); *H01M 2/08* (2013.01); *H01M 2/1673* (2013.01); *H01M 10/0431* (2013.01); *H01M 10/0587* (2013.01); *B29K 2623/12* (2013.01); *B29K 2655/00* (2013.01); *B29L 2031/7146* (2013.01); *B32B 2250/03* (2013.01); *B32B 2255/06* (2013.01); *B32B 2457/10* (2013.01); *B32B 2553/00* (2013.01); *H01M 2220/30* (2013.01)

(56) References Cited

U.S. PATENT DOCUMENTS

| | | | | |
|---|---|---|---|---|
| 6,790,555 | B2 | 9/2004 | Kolb et al. | |
| 9,178,186 | B2 * | 11/2015 | Hatta .................... | H01M 2/021 |
| 2002/0081491 | A1 | 6/2002 | Gross et al. | |
| 2005/0069764 | A1 * | 3/2005 | Kodama ............... | H01M 2/021<br>429/185 |
| 2005/0112461 | A1 | 5/2005 | Amine et al. | |

FOREIGN PATENT DOCUMENTS

| | | | |
|---|---|---|---|
| JP | 2004-146183 | A | 5/2004 |
| JP | 2004-253158 | A | 9/2004 |
| JP | 2005-108486 | A | 4/2005 |
| KR | 2003-0027459 | A | 4/2003 |
| KR | 2003-0061159 | A | 7/2003 |
| KR | 2003-0078453 | A | 10/2003 |

* cited by examiner

CELL

CROSS-REFERENCE TO RELATED APPLICATIONS

This application is a continuation of U.S. application Ser. No. 14/870,703, filed Sep. 30, 2015, which is a continuation of U.S. application Ser. No. 14/334,208, filed Jul. 17, 2014, now U.S. Pat. No. 9,178,186, which is a continuation of U.S. application Ser. No. 13/549,116, filed Jul. 13, 2012, now U.S. Pat. No. 8,871,383, which is a continuation of U.S. application Ser. No. 11/289,191, filed Nov. 29, 2005, now U.S. Pat. No. 8,263,256, which claims priority to Japanese Application No. 2004-357820, filed Dec. 10, 2004, the disclosures of which are hereby incorporated by reference herein.

BACKGROUND

The present invention relates to cells, and more particularly, relates to a cell formed by using a laminate film as an exterior packaging material.

In recent years, a great number of portable electronic apparatuses such as camera-incorporated VTRs (videotape recorders), mobile phones, and laptop computers have been introduced into the market, and trends toward miniaturization of the portable electronic apparatuses and reduction in weight thereof have been positively pursued. Concomitant with the trends described above, cells used as power sources of portable electronic apparatuses are rapidly increasing in demand, and in order to realize miniaturization of the apparatuses and reduction in weight thereof, cell engineering has been requested to reduce the weight and thickness of a cell and to enable it to be efficiently accommodated in a limited space of a portable electronic apparatus. As a cell capable of satisfying the requests described above, for example, lithium ion cells, which have a high energy density and output density, may be mentioned as one of the most preferable cells.

Among the various cells, a cell having a high degree of freedom of shape, a thin sheet-type cell having a large area, a thin card-type cell having a small area, and the like have been desired; however, as long as a related method is employed which uses a metal can as an exterior packaging material, it has been difficult to manufacture thin cells.

In order to overcome the problem described above, for example, a cell containing a material imparting adhesive properties to an electrolyte, and a cell containing a polymer gel electrolyte have been investigated. In the cells described above, the electrode and the electrolyte are tightly adhered to each other, and hence the contact state therebetween can be ensured. Accordingly, a thin cell can be manufactured by using an exterior packaging film such as an aluminum laminate film.

Heretofore, as applications of laminate films, for example, food, pharmaceuticals, and films may be mentioned; however, due to expiration dates given to products mentioned above, long-term reliability may not be always required for the laminate films in many cases. On the other hand, since secondary cells are used for a long time while charge and discharge are repeatedly performed, the lamination film is particularly requested to have good long-term reliability.

FIG. 1 is a schematic perspective view showing a cell which uses a laminate film as an exterior packaging material. Reference numeral 1 indicates a cell packaged in the laminate film. Since the laminate film has no electrical conductivity, electrode terminals 2 are necessarily provided along a side at which two parts of the laminate film are overlapped with each other so as to extend outside. In the state as described above, two parts of an interior resin film of the laminate film are disposed to face each other, and thermal welding is performed along a peripheral portion of a cell element, so that air-tight sealing can be performed. In this case, when the width of the film which is sealed by the thermal welding is decreased, a larger cell element can be designed, and hence, a cell having a higher capacity can be obtained.

FIG. 2 shows one example of a main structure of a laminate film 10. A metal foil indicated by reference numeral 11 is provided between a resin film 12 and a resin film 13 to form a multilayer film having humidity resistance and insulating properties. As the resin film 12 provided outside, nylon or poly(ethylene terephthalate) is used due to its fine appearance, toughness, and flexibility. The metal foil 11 has an important role of protecting a content packaged in the laminate film from entering moisture, oxygen, and light, and in consideration of light-weight properties, elongation properties, price, and processability, aluminum (Al) has been most widely used. Two parts of the interior resin film 13, facing each other, are melted by application of heat or ultrasonic sound so as to be welded to each other; hence a polyolefin resin is preferably used, and a cast polypropylene (CPP) resin has been used in many cases. Adhesive layers 14 may be provided between the metal foil 11 and the resin films 12 and 13, whenever necessary.

When a cell element is packaged in the laminate film 10, followed by thermal welding, the inside CPP layer is melted, and adhesion is carried out. However, a metal of the electrode terminal 2 extending from the cell element has poor adhesion properties to the CPP. Hence, as shown in FIGS. 1 and 3, in order to improve the adhesion to the CPP, resin material is adhered to two surfaces of the electrode terminal 2. This resin material is called a sealant 3.

As problems which may arise when an aluminum laminate film is used as an exterior packaging material, for example, since moisture is liable to infiltrate the cell to cause unfavorable electrolytic chemical reaction therein, degradation in cell properties may be mentioned. Moisture does not infiltrate through an Al layer and mostly infiltrates the interior resin (CPP) portion.

The amount of infiltrating moisture is proportional to a cross-sectional area (cross-sectional area of the CPP layer) of an infiltration path and is reciprocally proportional to the length thereof (sealing width). Accordingly, in order to prevent moisture infiltration, it is necessary that the thickness of the CPP layer be decreased to decrease the cross-sectional area or that the sealing width, that is, the path length, be increased. In view of increase in cell capacity, in order to reduce the amount of infiltrating moisture, it is more preferable that the infiltration path be narrowed by decreasing the thickness of the CPP layer. In this case, since the thickness of the laminate film itself is decreased, the size of an entire cell can be designed larger, and as a result, the capacity thereof can be increased.

However, when the sealing width is decreased, it becomes disadvantageously difficult to ensure the strength of a sealed portion. For solving this problem, it may be required to perform thermal welding using a metal block heater having a large heat capacity. When a related laminate film having a general thickness is used, since the interior resin film 13 has a thickness to a certain extent, even when the electrode terminal 2 is clamped by the metal block heater in thermal welding, the resin film 13 may absorb the pressure given thereby. However, when the interior resin film 13 has a small thickness, a large pressure is given particularly to a part of the electrode terminal 2 clamped by the metal block heater, and as a result, the electrode terminal 2 may be sheared or the electrode terminal 2 may penetrate the resin film 13 to cause short-circuiting with the metal foil 11.

Hence, as disclosed in Japanese Unexamined Patent Application Publication No. 2000-348695, when recesses 21 are formed in a metal block heater 20 at positions corresponding to the electrode terminals 2, and thermal welding is performed while the recesses 21 and the electrode terminals 2 are being properly positioned, the problem as described above may be solved (see FIGS. 4A and 4B).

SUMMARY

However, besides the above problem, other problems may arise when the thickness of the CPP layer is decreased. For example, as shown in FIG. 5, short-circuiting may disadvantageously occur between the electrode terminal 2 and the Al layer when cutting burrs (hereinafter referred to as "burrs" in some cases) 30, which are generated when the laminate film 10 is cut, penetrate the CPP layer, resulting in short-circuiting between the negative and positive electrode terminals of the cell.

In addition, even when burrs 30 project outside of the cell or are not present, if a head portion of a metal block heater 20 applies a pressure to an edge portion of the laminate film 10 in thermal welding, short-circuiting may probably occur.

Hence, in consideration of the problems described above, it is desirable to have a cell having superior safety such that no short-circuiting caused by burrs and/or pressure application in thermal welding occurs and such that no degradation in cycle properties caused by moisture infiltration occurs.

In order to solve the problems described above, according to an embodiment of the present invention, there is provided a cell having: a cell element including a positive electrode having a belt-shaped metal foil and reaction layers provided on two surfaces thereof, a negative electrode having a belt-shaped metal foil and reaction layers provided on two surfaces thereof, and an electrolyte; a laminate film for packaging the cell element, having a sealing portion and being composed of an exterior resin layer, an interior resin layer, and a metal layer provided between the exterior layer and the interior resin layer, the sealing portion being thermal welded on a part of the laminate film apart from an edge portion thereof to form a thermal welded portion for sealing the cell; and electrode terminals electrically connected to the cell element and extending outside through the sealing portion. In the cell described above, a thickness $t_2$ of the edge portion of the laminate film is larger than a thickness $t_1$ of the thermal welded portion.

In addition, according to another embodiment of the present invention, there is provided a cell having: a cell element including a positive electrode having a belt-shaped metal foil and reaction layers provided on two surfaces thereof, a negative electrode having a belt-shaped metal foil and reaction layers provided on two surfaces thereof, and an electrolyte; a laminate film for packaging the cell element, having a sealing portion and being composed of an exterior resin layer, an interior resin layer, and a metal layer provided between the exterior layer and the interior resin layer, the sealing portion being thermal welded to form thermal welded portions for sealing the cell; and electrode terminals electrically connected to the cell element and extending outside through the sealing portion. In the cell described above, a thickness $t_4$ of thermal welded portions including the electrode terminals is larger than a thickness $t_3$ of thermal welded portions including no electrode terminals.

According to the embodiments of the present invention, problems can be solved which may arise when a thin laminate film is used as an exterior packaging material in order to improve the cell capacity, and a cell having superior performance can be obtained in which no short-circuiting occurs, nor does moisture infiltration.

DETAILED DESCRIPTION

Hereinafter, a cell according to an embodiment of the present invention will be described in detail.

Figure 6:
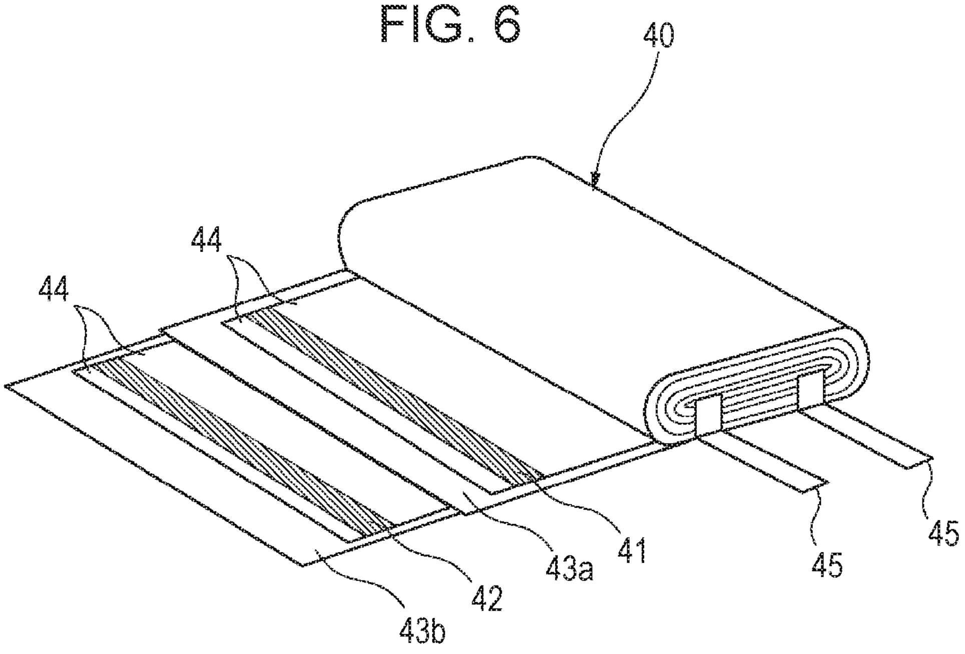
FIG. 6 is a schematic perspective view showing one example of a cell element forming a cell according to an embodiment of the present invention.

FIG. 6 shows one example of a cell element forming the cell according to the embodiment of the present invention. This cell includes a cell element 40 which is formed of a belt-shaped positive electrode 41, a separator 43*a*, a belt-shaped negative electrode 42 facing the positive electrode

41, and a separator 43*b*, laminated to each other and wound in a longitudinal direction. In addition, onto two surfaces of each of the positive electrode 41 and the negative electrode 42, a gel electrolyte 44 is applied.

[Positive Electrode]

The positive electrode 41 is formed of a positive electrode collector and positive electrode active material layers provided on two surfaces thereof, the active material layers containing a positive electrode active material. As the positive electrode collector, for example, a metal foil such as an Al foil, a nickel (Ni) foil, or a stainless steel foil may be used.

The positive electrode active material layer is composed, for example, of a positive electrode active material, a binding agent and a conductive agent. The constituent elements mentioned above are uniformly mixed together to form a positive electrode mixture, and the mixture thus prepared is dispersed in a solvent to form a slurry. Next, this slurry is uniformly applied onto the positive electrode collector using a doctor blade method or the like, followed by drying at a high temperature to remove the solvent, so that the positive electrode active material layer is formed. In this embodiment, the positive electrode active material, the conductive agent, the binding agent, and the solvent described above are preferably uniformly mixed together, and the mixing ratios thereof may be optionally determined.

As the positive electrode active material, a composite oxide composed of lithium and a transition metal may be used. In particular, for example, $LiCoO_2$, $LiNiO_2$, and $LiMn_2O_4$ may be mentioned. In addition, a solid solution thereof in which some atoms of the transition metal element are replaced with other atoms may also be used. For example, $LiNi_{0.5}Co_{0.5}O_2$ and $LiNi_{0.8}Co_{0.2}O_2$ may be mentioned.

In addition, as the conductive agent, for example, a carbon material such as carbon black or graphite may be used. As the binding agent, for example, poly(vinylidene fluoride) or polytetrafluoroethylene may be used. In addition, as the solvent, for example, N-methyl pyrrolidone may be used.

The positive electrode 41 has a positive electrode terminal (indicated by an electrode terminal 45 shown in FIG. 6) connected to an electrode end portion by spot welding or ultrasonic welding. This positive electrode terminal is preferably formed of a metal foil or a mesh metal; however, as long as being stable from electrochemical and chemical points of views and having electrical conductivity, any materials other than metals may also be used. As a material for the positive electrode terminal, for example, Al may be mentioned.

[Negative Electrode]

The negative electrode 42 is formed of a negative electrode collector and negative electrode active material layers provided on two surfaces thereof, the active material layers containing a negative electrode active material. As the negative electrode collector, for example, a metal foil such as a copper foil, a Ni foil, or a stainless steel foil may be used.

For example, the negative electrode active material layer is composed of a negative electrode active material and, whenever necessary, also contains a binding agent and a conductive agent. The constituent elements mentioned above are uniformly mixed together to form a negative electrode mixture, and the mixture thus prepared is dispersed in a solvent to form a slurry. Next, this slurry is uniformly applied onto the negative electrode collector by a doctor blade method or the like, followed by drying at a high temperature to remove the solvent, so that the negative electrode active material layer is formed. In this embodiment, the negative electrode active material, the conductive agent, the binding agent, and the solvent described above are preferably uniformly mixed together, and the mixing ratios thereof may be optionally determined.

As the negative electrode active material, a carbon material or a composite of a metal-based material and a carbonaceous material may be used, that is capable of doping and dedoping a lithium metal compound, lithium alloy, or lithium. In particular, as the carbon material capable of doping and dedoping lithium, for example, graphite, non-graphitizable carbon, and graphitizable carbon may be mentioned. As the graphite, for example, natural graphite and artificial graphite such as mesophase carbon microbeads, carbon fibers, cokes, and the like may be used. As a material forming an alloy with lithium, various types of metals may be used, and among those, tin (Sn), cobalt (Co), indium (In), Al, silicon (Si), and alloys thereof are used in many cases. When a lithium metal is used, a powder thereof is not always necessarily processed together with a binding agent to form a coating film, and a rolled lithium metal sheet may also be used.

In addition, as the binding agent, for example, poly (vinylidene fluoride) or a styrene-butadiene rubber may be used. In addition, as the solvent, for example, N-methyl pyrrolidone or methyl ethyl ketone may be used.

In addition, as is the positive electrode 41, the negative electrode 42 also has a negative electrode terminal (indicated by the electrode terminal 45 in FIG. 6) connected to an electrode end portion by spot welding or ultrasonic welding. This negative electrode terminal is preferably formed of a metal foil or a mesh metal; however, as long as being stable from electrochemical and chemical points of views and having electrical conductivity, a material other than metals may also be used. As a material for the negative electrode terminal, for example, there may be mentioned copper or Ni.

The positive electrode terminal and the negative electrode terminal preferably extend in the same direction; however, as long as the terminals cause no short-circuiting and no degradation in cell properties, extending directions of the terminals may be optionally selected. In addition, as long as the positive electrode terminal and the negative electrode terminal are electrically connected to respective connection places, the places to which the terminals are connected and the connection method thereof may not be particularly limited to those described above by way of example.

[Electrolyte]

As an electrolyte, an electrolytic salt and an organic solvent, which are generally used for a lithium ion cell, may be used, and in addition, a gel electrolyte and an electrolyte solution may both be used.

As a non-aqueous solvent, in particular, there may be mentioned, for example, ethylene carbonate, propylene carbonate, γ-butyrolactone, dimethyl carbonate, diethyl carbonate, ethyl methyl carbonate, dipropyl carbonate, ethyl propyl carbonate, solvents obtained from the above carbonates by replacing a hydrogen atom thereof with a halogen atom. The solvents mentioned above may be used alone or in combination at a predetermined mixing ratio.

As the electrolyte salts, an electrolyte salt which is dissolved in the above non-aqueous solvents may be used. For example, there may be mentioned $LiPF_6$, $LiBF_4$, $LiN(CF_3SO_2)_2$, $LiN(C_2F_5SO_2)_2$, and $LiClO_4$. As the concentration of the electrolyte salt, a concentration obtained by dissolving the above salt in the solvent may be used without causing any problem; however, the amount of lithium ions is preferably in the range of 0.4 to 2.0 moles relative to 1 kg of the non-aqueous solvent.

In the case of a gel electrolyte, the electrolyte solution described above is processed with a matrix polymer to form a gel electrolyte. As the matrix polymer, a material may be used which can be dissolved in a non-aqueous electrolyte solution composed of the non-aqueous solvent and the electrolyte salt dissolved therein so as to form a gel electrolyte. As the matrix polymer described above, a polymer containing repeating units, such as poly(vinylidene fluoride), poly(ethylene oxide), poly(propylene oxide), poly(acrylonitrile), and poly(methacrylonitrile), may be mentioned by way of example. The polymers mentioned above may be used alone or in combination.

Among those mentioned above as the matrix polymer, particularly preferable examples are poly(vinylidene fluoride) and a copolymer of poly(vinylidene fluoride) incorporating 7.5% or less of hexafluoropropylene. The polymer described above has a number average molecular weight in the range of $5.0\times10^5$ to $7.0\times10^5$ (500,000 to 700,000) or has a weight average molecular weight in the range of $2.1\times10^5$ to $3.1\times10^5$ (210,000 to 310,000), and the intrinsic viscosity of the polymer is set in the range of 1.7 to 2.1.

[Separator]

A separator is formed of a porous polyolefin film such as polypropylene or polyethylene or a porous inorganic film such as non-woven ceramic fabrics and may also have a laminate structure composed of at least two porous films mentioned above. Among those mentioned above, a porous film made of polyethylene or polypropylene is most effectively used.

In general, a separator having a thickness of 5 to 50 μm is preferably used; however, a thickness of 7 to 30 μm is more preferable. When the separator is excessively thick, since the amount of an active material is decreased, the cell capacity is decreased, and in addition, current properties are degraded due to decrease in ion conductivity. On the other hand, when the separator is excessively thin, mechanical strength of the film is decreased.

Figure 1:
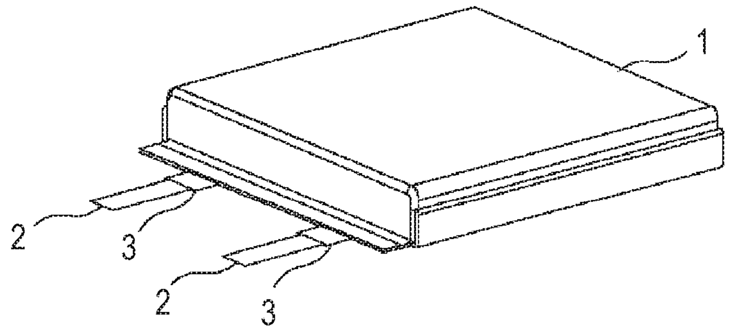
FIG. 1 is a schematic perspective view showing a cell which uses a laminate film as an exterior packaging material.
Figure 2:
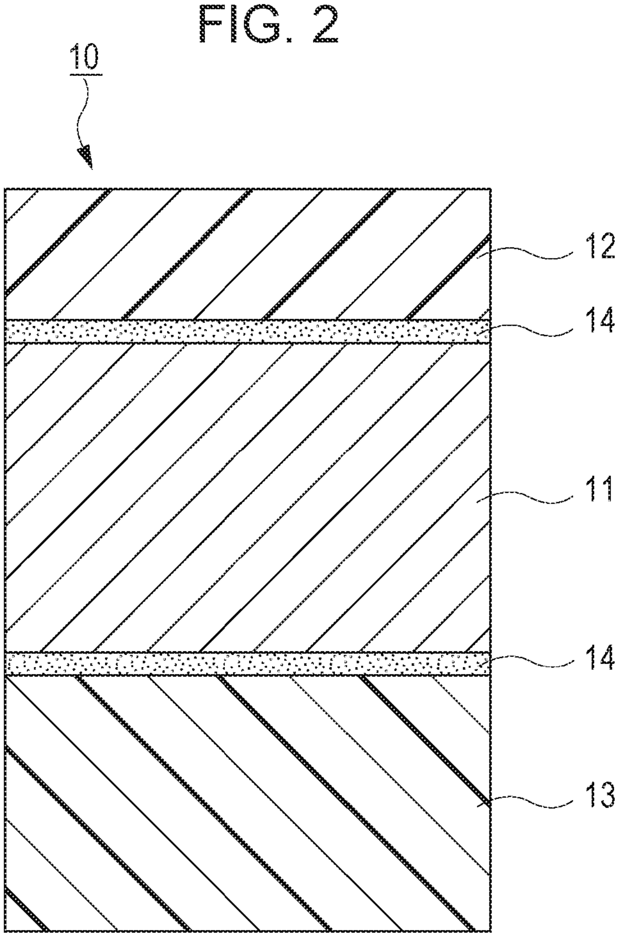
FIG. 2 is a cross-sectional view of a main structure of a laminate film as one example.
Figure 3:
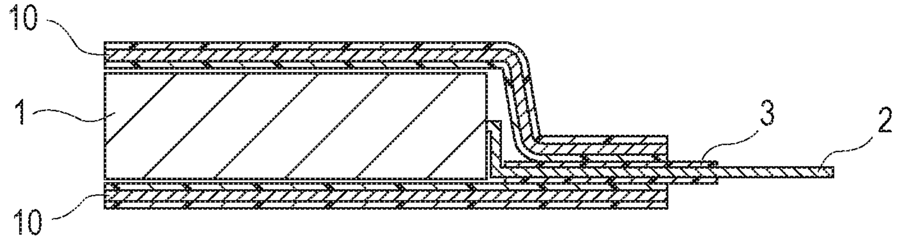
FIG. 3 is a cross-sectional view showing a cell formed by using an electrode terminal provided with a sealant for preventing the contact between the electrode terminal and a laminate film.
Figure 4A:
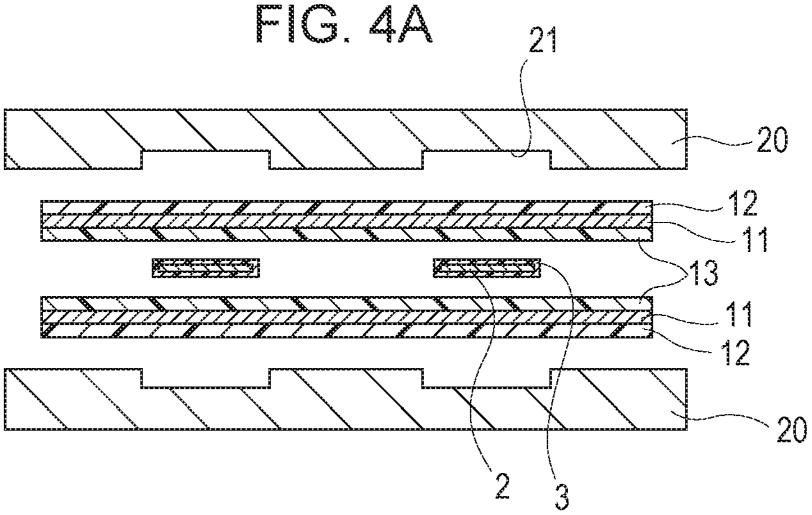
FIGS. 4A and 4B are schematic views for illustrating a thermal welding method for protecting electrode terminals from a large pressure applied thereto.
Figure 4B:
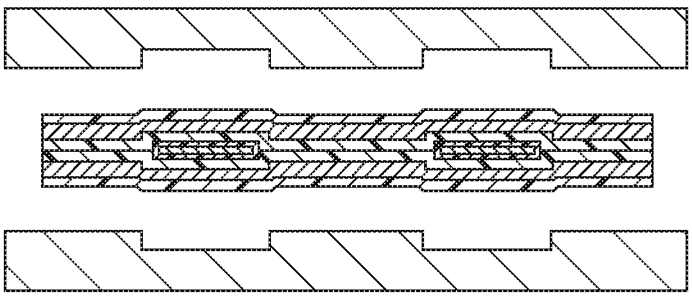
Figure 5:
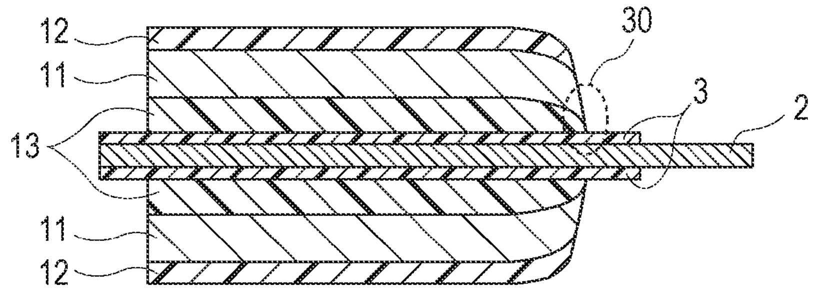
FIG. 5 is a schematic view showing the state in which cutting burrs of Al generated in cutting a laminate film penetrate a resin layer to cause short-circuiting with an electrode terminal.

A laminate film for packaging the cell element 40 as described above has the cross-sectional structure shown in FIG. 2, so that the cell element 40 is covered and sealed with the laminate film having humidity resistance and insulation properties. The electrode terminals 2 are connected to the respective positive electrode 41 and the negative electrode 42 and are clamped at a sealing portion of the laminate film so as to extend outside.

As a laminate film having suitable properties of forming a highly safety cell although having a small thickness which forms a narrow thermal welded portion, a preferable laminate film was discovered which has the structure composed of a nylon or PET film having a thickness of 15±5 μm as an exterior layer, an Al foil having a thickness of 35±5 μm, and a CPP film having a thickness of 30±5 μm as an interior layer. In this structure, adhesive layers having a thickness of 2 to 3 μm may be provided on both sides of the Al foil as shown in FIG. 2.

Figure 7:
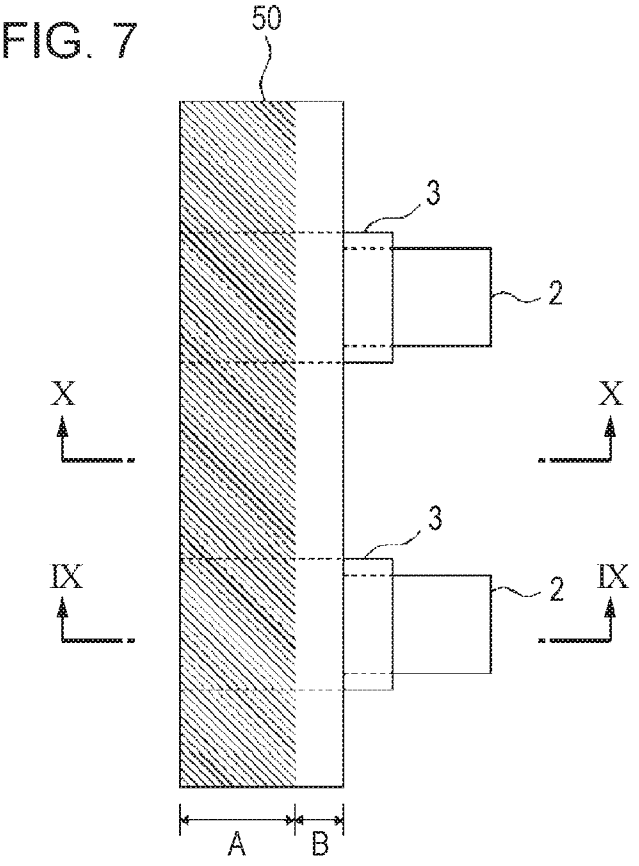
FIG. 7 is a schematic view showing a contact position of a heater head when thermal welding is performed on a part of a laminate film apart from an edge portion thereof.

In this embodiment according to the present invention, as shown in FIG. 7, along a side of the laminate film from which the electrode terminals extend, when thermal welding is performed using a heater head on a part of the laminate film apart from the edge portion thereof, a cell is formed so that the thickness of the edge portion of the laminate film is larger than that at a sealed portion, and hence short-circuiting caused by burrs can be prevented. In addition, by the method described above, short-circuiting which may occur when the heater head is brought into contact with the edge portion of the laminate film can also be prevented. FIG. 7 is a schematic plan view showing an electrode terminal extension side of the cell element, and a portion A shown by oblique lines is the sealed portion.

Figure 8:
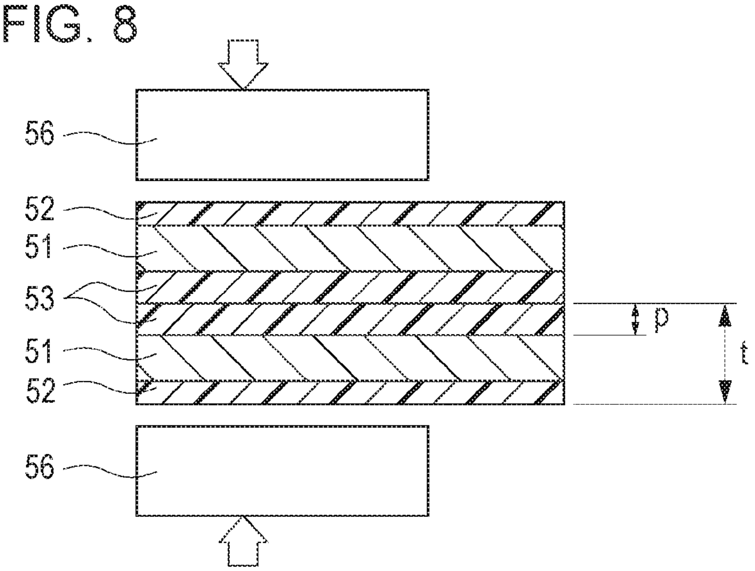
FIG. 8 is a schematic view showing the state in which thermal welding is performed on a part of a laminate film apart from an edge portion thereof.

FIG. 8 is a schematic view showing the state in which thermal welding is performed on a part of a laminate film 50 apart from an edge portion thereof using a heater head 56. The laminate film 50 has a three-layered structure composed of an Al layer 51, an outermost nylon or PET layer 52, and an interior CPP layer 53 and has humidity resistance and insulation properties. In this embodiment, the thickness of the laminate film 50 and the thickness of the CPP layer 53 are represented by t and p, respectively.

Figure 9:
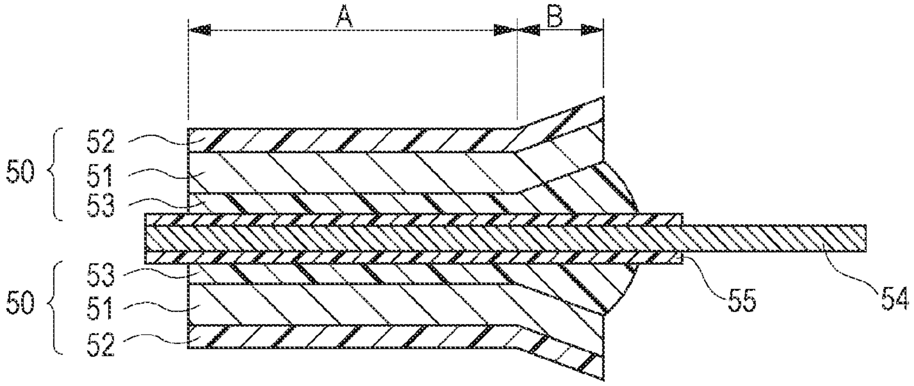
FIG. 9 is a cross-sectional view of an electrode terminal portion of a cell after thermal welding is performed on a part of a laminate film apart from an edge portion thereof.

FIG. 9 is a cross-sectional view of an electrode terminal portion at the electrode terminal extension side of the cell thus formed (taken along a line IX-IX shown in FIG. 7). Reference numeral 54 indicates an electrode terminal, and the electrode terminal 54 is coated with a sealant 55 in order to improve the adhesion with the CPP layer.

A portion indicated by A is a part of the laminate film on which thermal welding is performed by the heater head, and a portion indicated by B is the edge portion of the laminate film on which thermal welding is not performed by the heater head. Since the portion A is heated and compressed by the heater head, the CPP is melted to flow to a non-compressed portion (portion B). Hence, the portion B gradually increases in thickness from the portion A to the edge portion of the laminate film. Although not directly heated by the heater head, the CPP of the portion B is melted by heat transmitted from the portion A and is adhered to the electrode terminal or the like in many cases. Even when the CPP of the portion B is not adhered to the electrode terminal and the like, any problems may not occur at all.

Figure 10:
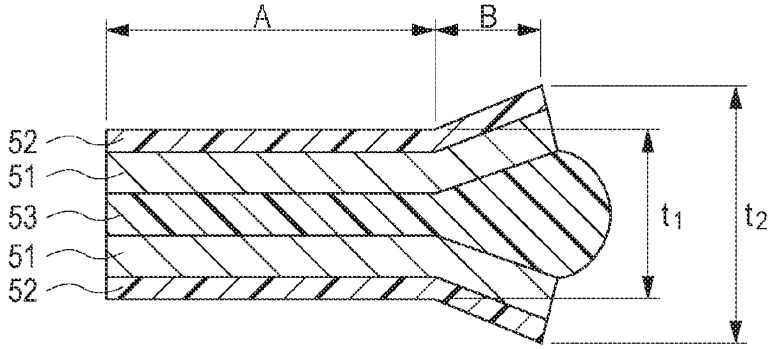
FIG. 10 is a cross-sectional view of a portion of a cell, which includes no electrode terminal, after thermal welding is performed on a part of a laminate film apart from an edge portion thereof.

In addition, FIG. 10 is a cross-sectional view of a thermal welded portion including no electrode terminal (taken along a line X-X in FIG. 7). A portion indicated by A is a part of the laminate film which is heated and compressed by the heater head, and a portion indicated by B is a part of the laminate film which is not heated and compressed by the heater head. As is the case shown FIG. 7, since the CPP is melted to flow, the portion B also gradually increases in thickness from the portion A to the edge portion of the laminate film.

When the thickness of the thermal welded portion and the thickness of the edge portion of the laminate film are represented by $t_1$ and $t_2$, respectively, and as shown in FIG. 8, when the thickness of the laminate film 50 and the thickness of the CPP layer are represented by t and p, respectively, the following equations are satisfied.

$$t\times2-p\times2+5<t_1<t\times2-5\ (\mu m)$$

$$t_1<t\times2<t_2\ (\mu m)$$

In order to prevent short-circuiting, thermal welding is performed so that the edge portion is not thermal welded, and as a result, the thickness of the edge portion becomes large as compared to that of the thermal welded portion located inside.

Since the CPP melted by heating and compression using the heater head flows to the edge portion of the laminate film, the thickness of the thermal welded portion is decreased as compared to an original thickness thereof (equivalent to the total thickness of the two laminate films). However, when an excessively large pressure is applied in thermal welding, the CPP excessively flows out, the amount of a resin responsible for thermal welding becomes deficient, and the sealing properties are degraded, so that moisture infiltrates the cell. In this case, moisture is reduced in the cell to generate gases, and as a result, the cell swells. When the thickness of a thermal welded CPP layer formed after thermal welding is larger than 5 μm, that is, when the thickness $t_1$ of the thermal welded portion is larger than [t×2−p×2+5] μm, the amount of the CPP does not become deficient, and as a result, infiltration of moisture can be sufficiently prevented.

In addition, when the thickness $t_1$ of the thermal welded portion is excessively large, sealing may not be sufficiently performed in some cases. Also in this case, moisture infiltrates the cell and is reduced therein to generate gases, and as a result, the cell swells. When the thickness of the thermal welded CPP layer formed after thermal welding is decreased by 5 μm or less as compared to an original thickness of the CPP layer (equivalent to the total thickness of the two CPP layers), the CPP is not sufficiently melted, and as a result, sealing properties may not be satisfactory. That is, when the thickness $t_1$ of the thermal welded portion is smaller than [t×2−5] μm, the CPP is sufficiently melted for sealing, and as a result, superior cycle properties can be maintained.

In addition, since heating and compression are performed by the heater head on the part of the laminate film apart from the edge portion thereof, the thickness $t_2$ of the edge portion of the laminate film becomes larger than the thickness $t_1$ of the thermal welded portion. Hence, short-circuiting can be prevented which occurs when burrs generated at the edge portion of the laminate film penetrate the sealant, and in addition, short-circuiting between the Al layer and the electrode terminal can also be prevented which occurs when the heater head is brought into contact with the edge portion of the laminate film in thermal welding.

Figure 11:
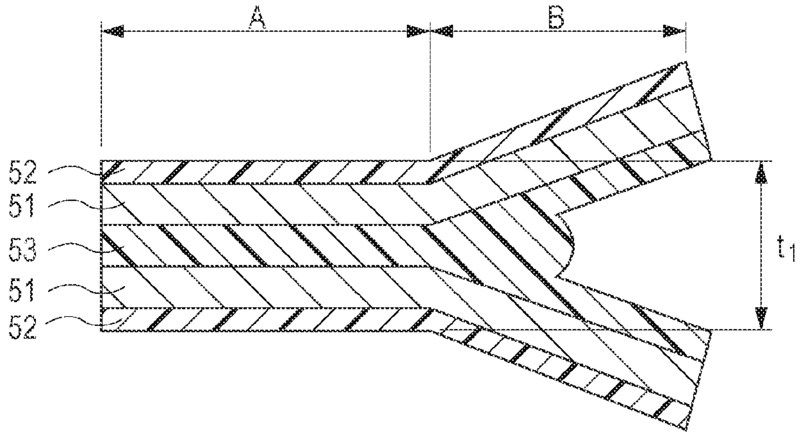
FIG. 11 is a cross-sectional view of a thermal welded portion obtained when an area of a laminate film which is not in contact with a heater head is large.

In this case, since the heater head does not compress the edge portion of the laminate film, the thickness $t_2$ will not be decreased smaller than an original thickness [t×2] μm (equivalent to the total thickness of the two laminate films) and is increased by a certain level which corresponds to the amount of the CPP which is pushed out of the thermal welded portion. However, when an area of the laminate film with which the heater head is not brought into contact is large, the CPP is not pushed to the edge portion of the film, and as a result, a cross-sectional shape as shown in FIG. 11 may be formed. In this case, using a slide gauge, the thickness $t_2$ of the edge portion of the laminate film is measured while the two extending portions shown in FIG. 11 are overlapped with each other by fingers or the like. Since being compressed, the thickness $t_1$ of the thermal welded portion is smaller than t×2, and since the thickness $t_2$ of the edge portion of the laminate film is t×2, $t_1<t_2$ is satisfied; hence, short-circuiting can be prevented.

Figure 12:
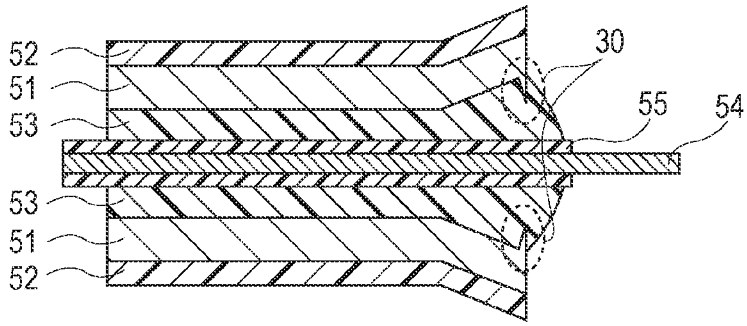
FIG. 12 is a cross-sectional view of an electrode terminal portion of a cell obtained by thermal welding performed on a part of a laminate film apart from an edge portion thereof, the view showing the state in which burrs are generated.

By the method described above, even in the case shown in FIG. 12 in which burrs 30 are generated, they are blocked by a thick CPP layer, and as a result, a cell can be manufactured in which short-circuiting is unlikely to occur.

In addition, besides the method described above, when the following method is used, a safer cell can be further manufactured.

Since the electrode terminal portion is heated and compressed by a metal heater as is the case in the past, a large pressure is locally applied to the electrode terminal portion as compared to a pressure applied to the other part of the thermal welded portion. Accordingly, thermal welding is performed using a heater head having notches at places corresponding to the electrode terminals.

Figure 13:
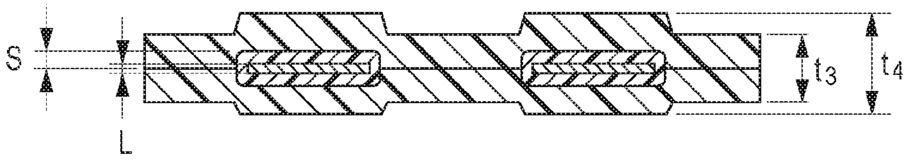
FIG. 13 is a schematic view showing a thickness $t_3$ of a thermal welded portion including no electrode terminal, a thickness $t_4$ of a thermal welded portion including an electrode terminal, a thickness L of the electrode terminal, and a thickness S of a sealant (one side)

In this case, since the heater head having notches is used, the thickness of the laminate film of a thermal welded portion including the electrode terminal is larger than the thickness of the laminate film of a thermal welded portion including no electrode terminal. As shown in FIG. 13, when the thicknesses of the laminate film, the CPP layer, the electrode terminal, and one side of the sealant covering the electrode terminal are represented by t, p, L, and S, respectively, a thickness t3 of the thermal welded portion including no electrode terminal and a thickness $t_4$ of the thermal welded portion including the electrode terminal are represented by the following equations, which are the thicknesses obtained when the cell is packaged in the film.

$$t\times2-p\times2+5<t_3<t\times2-5\ (\mu\text{m})$$

$$t\times2-p\times2+5+(L+S)<t_4<t\times2-5+(L+S)(\mu\text{m})$$

The thickness $t_3$ of the thermal welded portion including no electrode terminal and the thickness $t_4$ of the thermal welded portion including the electrode terminal are both decreased smaller than the respective original thicknesses thereof since the CPP is melted to flow in thermal welding which is performed by heating and compression using the heater head. When the thickness of a thermal welded CPP layer formed after the thermal welding is larger than 5 μm, that is, the thickness $t_3$ of the thermal welded portion including no electrode terminal is larger than [t×2−p×2+5] μm, the amount of the CPP is not deficient, infiltration of moisture can be sufficiently prevented. In addition, when the thickness of the thermal welded CPP layer formed after the thermal welding is decreased by 5 μm or less from the original thickness of the CPP layer (equivalent to the total thickness of the two CPP layers), the CPP is not sufficiently melted, and as a result, the sealing properties are not so superior. That is, when the thickness $t_3$ of the thermal welded portion including no electrode terminal is smaller than [t×2−5] μm, the CPP is sufficiently melted so that the sealing is well performed, and hence superior cycle properties can be maintained.

In addition, besides the CPP layer of the thermal welded portion including the electrode terminal, the sealant covering the electrode terminal is also melted, and hence the thickness of the sealant is decreased. A resin of the sealant flows by thermal welding, and the thickness of the sealant is decreased to approximately one half. When the thickness of the sealant is further decreased, it becomes difficult to prevent the contact between the electrode terminal and the laminate film. In addition, when the sealant is not so much melted, thermal welding between the laminate film and the electrode terminal is not sufficiently performed, and as a result, moisture is liable to infiltrate the cell.

However, although a large amount of the sealant flows, when the total thickness together with the CPP is in a predetermined range, the sealing may be sufficiently performed. In addition, although only a small amount of the sealant is melted, when a large amount of the CPP is melted for sealing, and the total thickness of the sealant and the CPP is in a predetermined range, the sealing may not cause any problems.

As is the case of the thickness $t_3$ of the thermal welded portion including no electrode terminal, when the thickness of the thermal welded CPP layer formed after the thermal welding is larger than 5 μm, that is, when the thickness $t_4$ of the thermal welded portion including the electrode terminal is larger than [t×2−p×2+5+(L+S)], infiltration of moisture can be sufficiently prevented. In addition, when the decrease in thickness is less than 5 μm, the sealing properties are not sufficient. That is, when the thickness $t_4$ of thermal welded portion including the electrode terminal is less than [t×2−

5+(L+S)], the CPP is sufficiently melted, and hence the sealing is sufficiently performed.

In the laminate film used in this embodiment, since the thickness of a related CPP layer is approximately 45 to 50 μm, the thickness of the CPP layer is set to 20 to 40 μm. As the thickness of the CPP layer is decreased, the cell capacity can be increased; however, since the CPP melted during thermal welding flows to the non-pressurized portion, when the CPP layer is excessively thin, the sealing properties are degraded. In consideration of the situations described above, the thickness of the CPP layer is preferably set in the range of 20 to 40 μm.

When the cell is formed as described above, since the pressure is not locally applied to the electrode terminal, the electrode terminal is not broken, the electrode terminal does not penetrate the CPP layer, and a necessary amount of the CPP does not flow away; hence, as a result, short-circuiting can be prevented.

The heater head used for thermal welding is not limited to that described above, and as long as sealing can be performed while the above conditions are satisfied, a heater head formed of an optional material and having an optional shape may be used.

EXAMPLES

Hereinafter, examples of the present invention will be described in detail.

[Formation of Positive Electrode]

First, 92 percent by weight of lithium cobalt oxide ($LiCoO_2$), 3 percent by weight of a poly(vinylidene fluoride) powder, and 5 percent by weight of a graphite powder were uniformly mixed together, and the mixture thus prepared was dispersed in N-methyl pyrrolidone, so that a positive electrode mixture in the form of a slurry was obtained. This positive electrode mixture was uniformly applied to two surfaces of an Al foil used as a positive electrode collector, followed by vacuum drying at 100° C. for 24 hours, so that a positive electrode active material layer was formed.

Next, after a positive electrode sheet was formed by compression molding of the positive electrode active material layer using a roller compression machine and was then cut into a belt-shaped positive electrode having a width of 50 mm and a length of 300 mm, an Al ribbon was welded as the electrode terminal to a part of the positive electrode which was not coated with the active material. In addition, polypropylene sheets were adhered to two surfaces of the electrode terminal to be held by an aluminum laminate film.

[Formation of Negative Electrode]

First, 91 percent by weight of artificial graphite and 9 percent by weight of a poly(vinylidene fluoride) powder were uniformly mixed together, and the mixture thus prepared was dispersed in N-methyl pyrrolidone, so that a negative electrode mixture in the form of a slurry was obtained. This negative electrode mixture was uniformly applied to two surfaces of a copper foil used as a negative electrode collector, followed by vacuum drying at 120° C. for 24 hours, so that a negative electrode active material layer was formed.

Next, after a negative electrode sheet was formed by compression molding of the negative electrode active material layer using a roller compression machine and was then cut into a belt-shaped negative electrode having a width of 52 mm and a length of 320 mm, a Ni ribbons was welded as the electrode terminal to a part of the negative electrode which was not coated with the active material. In addition, polypropylene sheets were adhered to two surfaces of the electrode terminal to be held by the aluminum laminate film.

[Formation of Gel Electrolyte]

A poly(vinylidene fluoride) copolymer including 6.9% of hexafluoropropylene, a non-aqueous electrolyte solution, and dimethyl carbonate (DMC) as a dilution solvent were mixed, stirred, and dissolved into each other, so that a sol electrolyte solution was obtained. The electrolyte solution was formed by dissolving 0.8 moles of $LiPF_6$ and 0.2 moles of $LiBF_4$ into a mixed solvent relative to 1 kg thereof, the mixed solvent being composed of ethylene carbonate and propylene carbonate at a mixing ratio of 6 to 4 on a weight basis. The mixing ratio among the poly(vinylidene fluoride) copolymer, electrolyte solution, and DMC were set to 1:6:12 on a weight basis. Next, the sol electrolyte solution thus obtained was uniformly applied onto two surfaces of each of the positive electrode and the negative electrode. Subsequently, the solvent was removed by drying at 50° C. for 3 minutes, gel electrolyte layers were formed on the two surfaces of each of the positive electrode and the negative electrode.

[Formation of Test Cell]

The belt-shaped positive electrode provided with the gel electrolyte layers on the two surfaces thereof and the belt-shaped negative electrode provided with the gel electrolyte layers on the two surfaces thereof were wound in the longitudinal direction with a separator provided therebetween, so that a cell element was obtained. As the separator, a porous polyethylene film having a thickness of 10 μm and a porosity of 33% was used.

Figure 14:
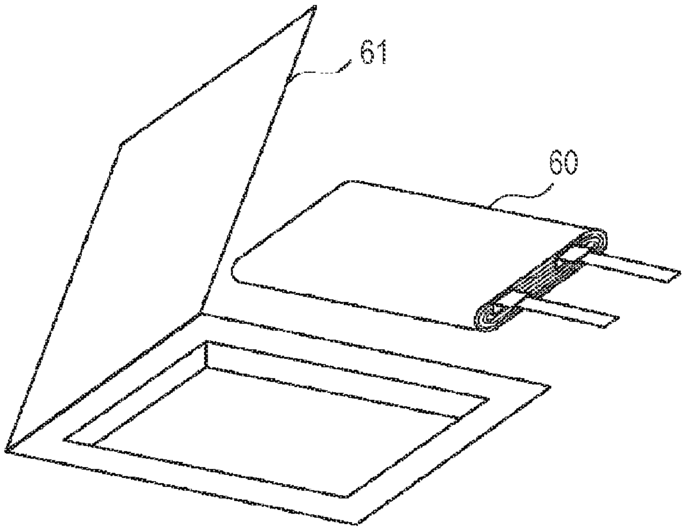
FIG. 14 is a schematic view showing the state in which a cell element is packaged in an aluminum laminate film.

Finally, as shown in FIG. 14, a cell element 60 was packaged in an aluminum laminate film 61 composed of an Al foil provided between two resin films, and thermal welding was performed along the peripheral portion of the aluminum laminate film 61 under vacuum conditions, so that sealing was performed. The width of a terrace portion (A+B shown in FIGS. 7, 9, and 10) of the cell was formed so as to be approximately 2.5 mm.

By using the test cells thus formed, the following were evaluated.

Example 1

Cells of Examples 1-1 to 1-3 and Comparative Examples 1-1 to 1-7 were formed by changing the width of the heater head, and in addition, the temperature of the heater head and the pressure in thermal welding were also changed, so that the thickness $t_1$ of the thermal welded portion and the thickness $t_2$ of the edge portion of the laminate film were changed. The cells of Examples 1-1 to 1-3 and Comparative Examples 1-1 and 1-2 were formed by using a heater head having a width of 2.0 mm, the cells of Comparative Examples 1-3 to 1-7 were formed using a heater head having a width of 3.0 mm, and for exterior packaging of each cell, an aluminum laminate film having a thickness of 85 μm was used, the film being composed of a nylon layer 15 μm thick, an adhesive layer 3 μm thick, an aluminum layer 35 μm thick, an adhesive layer 2 μm thick, and a CPP layer 30 μm thick in that order from the outer side. In addition, as the electrode terminal, an aluminum ribbon 4 mm wide and 70 μm thick was used, and onto the two surfaces of the electrode terminal to be held by the aluminum laminate film, polypropylene sheets 6 mm wide and 50 μm thick were adhered.

In the case in which the laminate film as described above is used, the thickness of the thermal welded portion is 110 μm when all the CPP is lost, and the thickness of the thermal welded portion is 170 μm when it is not compressed at all and is further increased when a resin flows thereto from another portion.

When the thickness of the thermal welded portion, the thickness of the edge portion of the laminate film, the thickness of the laminate film, and the thickness of the CPP layer are represented by $t_1$, $t_2$, t, and p, respectively, and when the thickness $t_1$ of thermal welded portion and the thickness $t_2$ of the edge portion of the laminate film satisfy the following equations, short-circuiting caused by burrs, short-circuiting between the Al layer of the laminate film and the electrode terminal caused by pressure application by the heater head, and gas generation caused by moisture infiltration can be prevented.

$$t\times2-p\times2+5<t_1<t\times2-5\ (\mu m)$$

$$t_1<t\times2<t_2\ (\mu m)$$

Hence, in the case of the laminate film used this time, when $115\ \mu m<t_1<165\ \mu m$ and $t_2\geq170\ \mu m$ are satisfied, a practically usable cell can be obtained.

In Table 1 below, the thickness $t_1$ of the thermal welded portion of the cell, the thickness $t_2$ of the edge portion of the laminate film, and the width of the heater head of each of Examples 1-1 to 1-3 and Comparative Examples 1-1 to 1-7 are shown. In addition, the upper limit and the lower limit of the thickness of the thermal welded portion described above are also shown in Table 1. Of the thickness $t_1$ of the thermal welded portion and the thickness $t_2$ of the edge portion of the laminate film shown in the table, values with underlines are out of the appropriate ranges.

TABLE 1

| | Film Thickness t (μm) | Thickness p of CPP Layer (μm) | Thermal Welded Portion Upper Limit | Thermal Welded Portion Lower Limit | Film × 2 | Thermal Welded Portion $t_1$ (μm) | Heater Head Width (mm) | Edge Portion $t_2$ (μm) |
|---|---|---|---|---|---|---|---|---|
| Example 1-1 | 85 | 30 | 115 | 165 | 170 | 120 | 2.0 | 220 |
| Example 1-2 | 85 | 30 | 115 | 165 | 170 | 140 | 2.0 | 190 |
| Example 1-3 | 85 | 30 | 115 | 165 | 170 | 160 | 2.0 | 170 |
| Comparative Example 1-1 | 85 | 30 | 115 | 165 | 170 | <u>110</u> | 2.0 | 230 |
| Comparative Example 1-2 | 85 | 30 | 115 | 165 | 170 | <u>168</u> | 2.0 | 170 |
| Comparative Example 1-3 | 85 | 30 | 115 | 165 | 170 | <u>110</u> | 3.0 | <u>110</u> |
| Comparative Example 1-4 | 85 | 30 | 115 | 165 | 170 | 120 | 3.0 | <u>120</u> |
| Comparative Example 1-5 | 85 | 30 | 115 | 165 | 170 | 140 | 3.0 | <u>140</u> |
| Comparative Example 1-6 | 85 | 30 | 115 | 165 | 170 | 160 | 3.0 | <u>160</u> |
| Comparative Example 1-7 | 85 | 30 | 115 | 165 | 170 | <u>168</u> | 3.0 | <u>168</u> |

Ten test cells as described above were formed in each Example and each Comparative Example, and the number of cells which caused short-circuiting was measured. In addition, for cells which did not cause short-circuiting, cell swelling (increase in thickness) (mm) caused by gas generation inside the cell and cycle properties (%) were measured.

In order to detect short-circuiting, the resistance between the positive electrode and the negative electrode was measured. A cell right after assembly has enough high series resistance, and when short-circuiting occurs, the resistance is decreased to a level of a milliohm order. As causes of short-circuiting, for example, the case may be mentioned in which the electrode terminal or burrs thereof penetrate the innermost CPP layer of the aluminum laminate film used as an exterior packaging material and reach the Al foil layer.

On the other hand, when a large pressure is applied to the portion including no electrode terminal in thermal welding, the CPP flows, the sealing properties are degraded, and as a result, moisture infiltrates the cell. In this case, moisture is reduced in the cell to generate gases, so that the cell swells. Although the cell may swell due to the presence of moisture in the electrolyte in some cases, the swelling is not significant. The thickness of a cell after assembly and first charging was measured, and when the increase in thickness was 0.1 mm or more, the cell was regarded as a defective product, and when the thickness was less than 0.1 mm, the cell was regarded as a good product.

Furthermore, regardless whether the thermal welded portion includes the electrode terminal or not, when the thickness of the thermal welded portion is excessively large, sealing may not be sufficiently performed in some cases. In this case, moisture infiltrates the cell and is then reduced to generate gases, and as a result, the cell swells. As is the case described above, after the thickness of a cell after assembly and first charging was measured, when the increase in thickness was 0.1 mm or more, the cell is regarded as a defective product, and when the thickness was less than 0.1 mm, the cell was regarded as a good product.

For measurement of the cycle properties, standard charging and 1C-3V cut-off constant current discharging were carried out, and the change in discharging capacity was measured for each cycle. In this example, a maintenance rate of capacity after 500 cycles was examined, and a cell having a maintenance rate of 80% or more was regarded as a good product. The maintenance rate of 80% or more is a value which is believed to be generally required and sufficient for the specification of a current portable electronic apparatus. When moisture infiltrates the cell, due to side reactions, the cycle properties are degraded. The cycle properties are calculated by the following equation.

Cycle Properties=100×(Discharging Capacity at 500th cycle)/(Discharging Capacity at first cycle)(%)

The structures of the cells of the individual examples and the results of the above evaluations are shown in Table 2. Of the thickness $t_1$ of the thermal welded portion and the thickness $t_2$ of the edge portion of the laminate film shown in the table, values with underlines are out of the appropriate ranges.

TABLE 2

| | Thermal Welded Portion $t_1$ (μm) | Heater Head Width (mm) | Edge Portion (μm) | Number of Cells Causing Short-Circuiting (Cells) | Gas Swelling (mm) | Cycle Properties (%) |
|---|---|---|---|---|---|---|
| Example 1-1 | 120 | 2.0 | 220 | 0 | 0.02 | 88 |
| Example 1-2 | 140 | 2.0 | 190 | 0 | 0.03 | 85 |
| Example 1-3 | 160 | 2.0 | 170 | 0 | 0.02 | 86 |
| Comparative Example 1-1 | 110 | 2.0 | 230 | 10 | — | — |
| Comparative Example 1-2 | 168 | 2.0 | 170 | 0 | 0.23 | 72 |
| Comparative Example 1-3 | 110 | 3.0 | 110 | 10 | — | — |
| Comparative Example 1-4 | 120 | 3.0 | 120 | 10 | — | — |
| Comparative Example 1-5 | 140 | 3.0 | 140 | 10 | — | — |
| Comparative Example 1-6 | 160 | 3.0 | 160 | 10 | — | — |
| Comparative Example 1-7 | 168 | 3.0 | 168 | 0 | 0.22 | 68 |

As apparent from the above table, in the cells of Examples 1-1 to 1-3 in which the heater head having a width of 2.0 mm which was smaller than the width of the terrace portion was used, when thermal welding was performed on a part of the laminate film apart from the edge portion thereof, the thickness $t_1$ of the thermal welded portion was in a predetermined range ($115<t_1<165$ (μm)), and the thickness $t_2$ of the edge portion of the laminate film was larger than the thickness $t_1$ of the thermal welded portion. As a result, no short-circuiting occurred, no swelling was observed, and hence superior cycle properties were obtained.

On the other hand, although the heater head having a width smaller than the width of the terrace portion was used, and thermal welding was performed on a part of the laminate film apart from the edge portion thereof, when the thickness $t_1$ of the thermal welded portion was not in a predetermined range, the test cell thus obtained did not work well. In Comparative Example 1-1, although the heater head having a width of 2.0 mm was used, and the thickness $t_1$ of the thermal welded portion was decreased to 110 μm, since sealing was performed by applying an excessively large pressure, the electrode terminal was broken, and as a result, short-circuiting occurred. In addition, in Comparative Example 1-2, although the heater head having a width of 2.0 mm was used, and the thickness $t_1$ of the thermal welded portion was increased to 168 μm, since sealing was performed by applying an excessively small pressure, the sealing properties were not sufficient, moisture infiltrated the cell, and as a result, gas swelling occurred.

Furthermore, as in Comparative Examples 1-3 to 1-6, when the heater head having a width of 3.0 mm was used, since the edge portion of the laminate film was compressed by the heater head, the electrode terminal and the Al layer caused short-circuiting, or burrs thereof penetrated the CPP layer and caused short-circuiting with the electrode terminal. In addition, as in Comparative Example 1-7, when the sealing was performed using the heater head having a width of 3.0 mm by applying a small pressure, no short-circuiting occurred; however, since the thickness $t_1$ of the thermal welded portion and the thickness $t_2$ of the edge portion of the laminate film were large, moisture infiltrated the cell to generate gases, and besides cell swelling, the cycle properties were degraded.

As described above, when the thickness of the edge portion of the laminate film is set larger than the thickness of the thermal welded portion, a cell can be manufactured in which no short-circuiting occurs, nor does swelling caused by gases.

Example 2

By changing the structure of the laminate film used as an exterior packaging material for the cell element and the temperature and pressure of the heater head in thermal welding, the thickness $t_3$ of the thermal welded portion and the thickness $t_4$ of the electrode terminal portion were changed, so that various test cells were formed. As the laminate film used as an exterior packaging material, one of the following laminate films was used. That is, there was used an aluminum laminate film having a total thickness of 85 μm composed of a 15 μm-thick outermost nylon layer, 3 μm-thick adhesive layer, 35 μm-thick aluminum foil, 2 μm-thick adhesive layer, and 30 μm-thick CPP layer or an aluminum laminate film having a total thickness of 75 μm, which had the same structure as that described above except that the thickness of the CPP layer was 20 μm (15 μm-thick nylon layer, 3 μm-thick adhesive layer, 35 μm-thick aluminum foil, 2 μm-thick adhesive layer, and 20 μm-thick CPP layer). In addition, a heater head having a width of 2.0 mm was used when the side from which the electrode terminal extended was thermal welded, and the width of a sealed portion including a part adhered to the electrode terminal or the like by heat transmitted from the thermal welded portion was set to 2.2 mm.

An Al ribbon having a width of 4 mm and a thickness of 70 μm was used as the electrode terminal of each of cells of Examples 2-1 to 2-14 and Comparative Examples 2-1 to 2-12, and polypropylene sheets each having a width of 6 mm and a thickness of 50 μm were adhered onto two surfaces of a part of the electrode terminal to be held by the aluminum laminate film. In addition, in Examples 2-15 and 2-16 and Comparative Examples 2-13 to 2-16, an Al ribbon having a width of 4 mm and a thickness of 100 μm was used as the electrode terminal, and polypropylene sheets each having a width of 6 mm and a thickness of 60 μm were adhered onto two surfaces of a part of the electrode terminal to be held by the aluminum laminate film.

In Example 2, in the case in which the laminate film having a total thickness of 85 μm is used, when all the CPP layer is lost, the thickness of the thermal welded portion is 110 μm, and the thickness of the thermal welded portion is 170 μm when the laminate film is not compressed at all and is further increased when a resin flows thereto from another portion.

In addition, when the laminate film having a total thickness of 75 μm is used, the thickness of the thermal welded portion is 110 μm when all the CPP is lost, the thickness of the thermal welded portion is 150 μm when the laminate film is not compressed at all and is further increased when a resin flows thereto from another portion.

When the thicknesses of the thermal welded portion including no electrode terminal, the thermal welded portion including the electrode terminal, the laminate film, the CPP layer, the electrode terminal, and one side of the sealant covering the electrode terminal are represented by $t_3$, $t_4$, t, p, L, and S, respectively, and when the thickness $t_3$ of the thermal welded portion including no electrode terminal and the thickness $t_4$ of the thermal welded portion including the electrode terminal satisfy equations shown below, which are the thicknesses obtained when the cell is packaged in the film, the following effects can be obtained.

$$t\times2-p\times2+5<t_3<t\times2-5\ (\mu m)$$

$$t\times2-p\times2+5+(L+S)<t_4<t\times2-5+(L+S)\ (\mu m)$$

That is, short-circuiting caused by burrs, short-circuiting between the Al layer of the laminate film and the electrode terminal caused by pressure applied by the heater head, and gas generation caused by moisture infiltration can be prevented. Hence, a practically usable cell can be obtained when the following conditions are satisfied in the individual Examples and Comparative Examples.

(1) In the case in which the laminate film having a total thickness of 85 μm, the electrode terminal having a thickness of 70 μm, and the sealant having a thickness (one side) of 50 μm are used (Examples 2-1 to 2-12 and Comparative Examples 2-1 to 2-8), 115 μm<$t_3$<165 μm and 235 μm<$t_4$<285 μm are satisfied.

(2) In the case in which the laminate film having a total thickness of 75 μm, the electrode terminal having a thickness of 70 μm, and the sealant having a thickness (one side) of 50 μm are used (Examples 2-13 and 2-14 and Comparative Examples 2-9 to 2-12), 115 μm<$t_3$<145 μm and 235 μm<$t_4$<265 μm are satisfied.

(3) In the case in which the laminate film having a total thickness of 85 μm, the electrode terminal having a thickness of 100 μm, and the sealant having a thickness (one side) of 60 μm are used (Examples 2-15 and 2-16 and Comparative Examples 2-13 to 2-16), 115 μm<$t_3$<165 μm and 275 μm<$t_4$<325 μm are satisfied.

In Table 3 below, the thickness of the laminate film, the thickness of the CPP layer, the thickness $t_3$ of the thermal welded portion including not electrode terminal, and the thickness $t_4$ of the thermal welded portion including the electrode terminal are shown. Of the thickness $t_3$ and the thickness $t_4$ shown in the table, values with underlines are out of the appropriate ranges described above. In addition, in Table 3, the thickness $t_3$ of the thermal welded portion including no electrode terminal and the thickness $t_4$ of the thermal welded portion including the electrode terminal are represented by a thermal welded part and an electrode terminal part, respectively, and the upper limits and the lower limits of the thermal welded part and the electrode terminal part are also shown.

TABLE 3

| | Film Thickness t (μm) | Thickness p of CPP Layer (μm) | Thermal Welded Part Lower Limit | Thermal Welded Part Upper Limit | Electrode Terminal Part Lower Limit | Electrode Terminal Part Upper Limit | Thermal Welded Part $t_3$ (μm) | Electrode Terminal Part $t_4$ (μm) |
|---|---|---|---|---|---|---|---|---|
| Example 2-1 | 85 | 30 | 115 | 165 | 235 | 285 | 117 | 240 |
| Example 2-2 | 85 | 30 | 115 | 165 | 235 | 285 | 140 | 240 |
| Example 2-3 | 85 | 30 | 115 | 165 | 235 | 285 | 162 | 240 |
| Example 2-4 | 85 | 30 | 115 | 165 | 235 | 285 | 117 | 270 |
| Example 2-5 | 85 | 30 | 115 | 165 | 235 | 285 | 140 | 270 |
| Example 2-6 | 85 | 30 | 115 | 165 | 235 | 285 | 162 | 270 |
| Example 2-7 | 85 | 30 | 115 | 165 | 235 | 285 | 120 | 245 |
| Example 2-8 | 85 | 30 | 115 | 165 | 235 | 285 | 120 | 260 |
| Example 2-9 | 85 | 30 | 115 | 165 | 235 | 285 | 120 | 275 |
| Example 2-10 | 85 | 30 | 115 | 165 | 235 | 285 | 150 | 245 |
| Example 2-11 | 85 | 30 | 115 | 165 | 235 | 285 | 150 | 260 |
| Example 2-12 | 85 | 30 | 115 | 165 | 235 | 285 | 150 | 275 |
| Example 2-13 | 75 | 20 | 115 | 145 | 235 | 265 | 120 | 240 |
| Example 2-14 | 75 | 20 | 115 | 145 | 235 | 265 | 120 | 240 |
| Example 2-15 | 85 | 30 | 115 | 165 | 275 | 325 | 140 | 300 |
| Example 2-16 | 85 | 30 | 115 | 165 | 275 | 325 | 140 | 300 |
| Comparative Example 2-1 | 85 | 30 | 115 | 165 | 235 | 285 | 112 | 240 |
| Comparative Example 2-2 | 85 | 30 | 115 | 165 | 235 | 285 | 168 | 240 |
| Comparative Example 2-3 | 85 | 30 | 115 | 165 | 235 | 285 | 112 | 270 |
| Comparative Example 2-4 | 85 | 30 | 115 | 165 | 235 | 285 | 168 | 270 |
| Comparative Example 2-5 | 85 | 30 | 115 | 165 | 235 | 285 | 120 | 220 |
| Comparative Example 2-6 | 85 | 30 | 115 | 165 | 235 | 285 | 120 | 300 |
| Comparative Example 2-7 | 85 | 30 | 115 | 165 | 235 | 285 | 150 | 220 |
| Comparative Example 2-8 | 85 | 30 | 115 | 165 | 235 | 285 | 150 | 300 |
| Comparative Example 2-9 | 75 | 20 | 115 | 145 | 235 | 265 | 102 | 240 |
| Comparative Example 2-10 | 75 | 20 | 115 | 145 | 235 | 265 | 148 | 240 |
| Comparative Example 2-11 | 75 | 20 | 115 | 145 | 235 | 265 | 120 | 210 |
| Comparative Example 2-12 | 75 | 20 | 115 | 145 | 235 | 265 | 120 | 270 |
| Comparative Example 2-13 | 85 | 30 | 115 | 165 | 275 | 325 | 112 | 300 |
| Comparative | 85 | 30 | 115 | 165 | 275 | 325 | 168 | 300 |

TABLE 3-continued

| | Film | Thickness p of CPP | Thermal Welded Part | | Electrode Terminal Part | | Thermal Welded | Electrode Terminal |
|---|---|---|---|---|---|---|---|---|
| | Thickness t (μm) | Layer (μm) | Lower Limit | Upper Limit | Lower Limit | Upper Limit | Part $t_3$ (μm) | Part $t_4$ (μm) |
| Example 2-14 | | | | | | | | |
| Comparative Example 2-15 | 85 | 30 | 115 | 165 | 275 | 325 | 140 | 260 |
| Comparative Example 2-16 | 85 | 30 | 115 | 165 | 275 | 325 | 140 | 340 |

Ten test cells as described above were formed in each Example and each Comparative Example, and the number of cells which caused short-circuiting was measured. In addition, for cells which did not cause short-circuiting, cell swelling (increase in thickness) (mm) caused by gas generation inside the cell and cycle properties (%) were measured. The measurement methods thereof are the same as those in Example 1.

In Table 4 below, the structures of the cells of the individual examples and the results of the above tests are shown. In addition, of the thickness $t_3$ of the thermal welded portion including no electrode terminal and the thickness $t_4$ of the thermal welded portion including the electrode terminal shown in the table, values with underlines are out of the appropriate ranges. In addition, in Table 4, the thickness of the thermal welded portion including no electrode terminal and the thickness of the thermal welded portion including the electrode terminal are represented by $t_3$ of the thermal welded part and $t_4$ of the electrode terminal part, respectively.

TABLE 4

| | Thermal Welded Part $t_3$ (μm) | Electrode Terminal Part $t_4$ (μm) | Number of Cells Causing Short-Circuiting (cells) | Gas Swelling (mm) | Cycle Properties (%) |
|---|---|---|---|---|---|
| Example 2-1 | 117 | 240 | 0 | 0.03 | 85 |
| Example 2-2 | 140 | 240 | 0 | 0.02 | 84 |
| Example 2-3 | 162 | 240 | 0 | 0.03 | 85 |
| Example 2-4 | 117 | 270 | 0 | 0.02 | 84 |
| Example 2-5 | 140 | 270 | 0 | 0.02 | 88 |
| Example 2-6 | 162 | 270 | 0 | 0.02 | 86 |
| Example 2-7 | 120 | 245 | 0 | 0.02 | 86 |
| Example 2-8 | 120 | 260 | 0 | 0.02 | 84 |
| Example 2-9 | 120 | 275 | 0 | 0.03 | 86 |
| Example 2-10 | 150 | 245 | 0 | 0.02 | 85 |
| Example 2-11 | 150 | 260 | 0 | 0.03 | 83 |
| Example 2-12 | 150 | 275 | 0 | 0.02 | 84 |
| Example 2-13 | 120 | 240 | 0 | 0.02 | 85 |
| Example 2-14 | 120 | 240 | 0 | 0.03 | 85 |
| Example 2-15 | 140 | 300 | 0 | 0.03 | 84 |
| Example 2-16 | 140 | 300 | 0 | 0.02 | 86 |
| Comparative Example 2-1 | 112 | 240 | 0 | 0.17 | 75 |
| Comparative Example 2-2 | 168 | 240 | 0 | 0.18 | 72 |
| Comparative Example 2-3 | 112 | 270 | 0 | 0.16 | 77 |
| Comparative Example 2-4 | 168 | 270 | 0 | 0.17 | 75 |
| Comparative Example 2-5 | 120 | 220 | 10 | — | — |
| Comparative Example 2-6 | 120 | 300 | 0 | 0.18 | 73 |
| Comparative Example 2-7 | 150 | 220 | 10 | — | — |
| Comparative Example 2-8 | 150 | 300 | 0 | 0.19 | 71 |

TABLE 4-continued

| | Thermal Welded Part $t_3$ (μm) | Electrode Terminal Part $t_4$ (μm) | Number of Cells Causing Short-Circuiting (cells) | Gas Swelling (mm) | Cycle Properties (%) |
|---|---|---|---|---|---|
| Comparative Example 2-9 | 102 | 240 | 10 | — | — |
| Comparative Example 2-10 | 148 | 240 | 0 | 0.20 | 69 |
| Comparative Example 2-11 | 120 | 210 | 10 | — | — |
| Comparative Example 2-12 | 120 | 270 | 0 | 0.22 | 63 |
| Comparative Example 2-13 | 112 | 300 | 10 | — | — |
| Comparative Example 2-14 | 168 | 300 | 0 | 0.21 | 66 |
| Comparative Example 2-15 | 140 | 260 | 10 | — | — |
| Comparative Example 2-16 | 140 | 340 | 0 | 0.23 | 68 |

As apparent from the above table, when the thickness of the thermal welded portion including the electrode terminal is appropriately larger than the thickness of the thermal welded portion including no electrode terminal, a cell having superior properties can be formed. Examples 2-1 to 2-16 shown in the table are the examples described above.

As a defective product, for example, a cell may be mentioned in which the thickness of the thermal welded portion including no electrode terminal is large. In this case, since the cross-sectional area of a moisture-infiltrating path is increased, and infiltrating moisture is turned into gases in the cell, the cell may swell or the cycle properties thereof may be degraded. For example, the above problems may be observed in Comparative Examples 2-2, 2-4, and 2-14. In the thermal welded portion including no electrode terminal, the total thickness is 170 μm when two parts of the laminate film are overlapped; however, in Comparative Examples 2-2, 2-4, and 2-14, the thickness after the thermal welding is 168 μm, and the CPP layer is not sufficiently melted, so that the sealing is not satisfactorily performed. Hence, moisture infiltrates the cell, and gases are generated, so that the gas swelling is large such as 0.18, 0.17, and 0.21 mm in Comparative Examples 2-2, 2-4, and 2-14, respectively.

On the other hand, when the thermal welded portion including no electrode terminal is excessively thin, a defective cell may be formed. For example, in Comparative Examples 2-1 and 2-3, the thickness $t_3$ of the thermal welded portion including no electrode terminal is 112 μm. Since the total thickness is 170 μm when the laminate films is folded and two parts thereof are overlapped, and the CPP film of each of the above two parts has a thickness of 30 μm, even when the CPP film is all melted and flows out, a total thickness of 110 μm is to be obtained. That is, since the thickness of a thermal welded CPP layer obtained after melting and flowing in Comparative Examples 2-1 and 2-3 becomes very small such as 2 μm, and the amount of a resin responsible for adhesion is not sufficient, moisture infiltrates the cell, and the cell properties are degraded.

Furthermore, for example, as is the case of Comparative Examples 2-5 and 2-7, when the thickness $t_4$ of the thermal welded portion including the electrode terminal is excessively small, the electrode terminal causes short-circuiting, and a cell may not be formed. In addition, for example, as is the case of Comparative Examples 2-6 and 2-7, when the thickness $t_4$ of the thermal welded portion including the electrode terminal is excessively large, moisture infiltrates the cell, and hence the cycle properties are degraded.

As described above, in consideration of the probability of short-circuiting and insufficient sealing properties, which may occur when a thin laminate film is used in order to improve the cell capacity, when the method for forming a cell, as described above, is used, a cell having superior safety and high performance can be obtained.

Heretofore, one embodiment of the present invention has been described in detail; however, the present invention is not limited to the above embodiment, and various modifications may be made without departing from the spirit and the scope of the present invention.

For example, in the above embodiment, the case is described in which the belt-shaped positive and negative electrodes which are laminated with the separator provided therebetween are wound in the longitudinal direction to form an electrode body as the cell; however, the present invention is not limited thereto and may be applied to a laminated electrode body composed of the positive electrode and the negative electrode laminated to each other or a folded electrode body in which the positive and negative electrodes are not wound but are folded several times.

In addition, the shape of the cell of the embodiment described above may be cylinder, square, and the like and is not particularly limited, and in addition, various sizes, such as thin type and large type cells, may be optionally formed.

It should be understood by those skilled in the art that various modifications, combinations, sub-combinations and alterations may occur depending on design requirements and other factors insofar as they are within the scope of the appended claims or the equivalents thereof.

What is claimed is:

1. A cell comprising:

a cell element including a positive electrode, a negative electrode, an electrolyte and a laminate film including an exterior layer, a metal layer, an interior layer, and a welded layer formed of the interior layer;

wherein a thickness of the welded layer is larger than 5 μm in a flat portion of the interior layer, wherein the welded layer increases in thickness from the flat portion to an end portion of the welded layer, and wherein when a thickness of the laminate film is t, a thickness of the interior layer is p and a thickness of the laminate film in the welded layer is t1, a following equation is satisfied:

$$t\times 2-p\times 2+5<t1<t\times 2-5\ (\mu m).$$

2. The cell according to claim 1, wherein the thickness of the welded layer in the flat portion is thinner than a thickness of the laminate film in an edge portion.

3. The cell according to claim 1, wherein the interior layer further includes at least one layer.

4. The cell according to claim 1, wherein the exterior layer includes one or both of a nylon and a poly(ethylene terephthalate), wherein the metal layer includes aluminum, and wherein the interior layer includes one or both of a polyolefin and a polypropylene.

5. The cell according to claim 1, wherein the laminate film includes a first adhesive layer between the exterior layer and the metal layer and a second adhesive layer between the metal layer and the interior layer.

6. The cell according to claim 1, wherein the positive electrode, the negative electrode and the separator are configured in a wound arrangement.

7. The cell according to claim 1, wherein the cell includes an electrode terminal and a sealant, and wherein at least a portion of the sealant is provided on the electrode terminal.

8. The cell according to claim 1, wherein a thickness of at least one side of the interior layer in an edge portion is from 20 μm to 40 μm.

9. A method of forming a cell including a cell element, comprising:

providing a laminate film to enclose the cell element, wherein the laminate film includes an exterior layer, an interior layer, and a metal layer, welding the laminate film to form a welded layer of the interior layer, while not welding the laminate film in an edge portion, wherein a thickness of the welded layer is larger than 5 μm in a flat portion of the welded layer, wherein the welded layer increases in thickness from the flat portion to an end portion of the welded layer, and wherein when a thickness of the laminate film is t, a thickness of the interior layer is p and a thickness of the laminate film in the welded layer is t1, a following equation is satisfied:

$$t\times 2-p\times 2+5<t1<t\times 2-5\ (\mu m).$$

10. The method according to claim 9, wherein the laminate film is welded using an ultrasonic welding.

11. The method according to claim 9, wherein the laminate film is welded using a heat and compression welding.

12. The method according to claim 9, wherein the cell includes a positive electrode, a negative electrode and a separator.

13. The method according to claim 12, wherein the positive electrode, the negative electrode and the separator are wound.

14. The method according to claim 9, wherein the cell includes an electrode terminal and a sealant, and wherein at least a portion of the sealant is provided on the electrode terminal.

15. The method according to claim 9, wherein the thickness of the welded layer in the flat portion is thinner than a thickness of the laminate film in an edge portion.

16. The method according to claim 9, wherein the interior layer includes at least one layer.

17. The method according to claim 9, wherein the exterior layer includes one or both of a nylon and a poly(ethylene terephthalate), wherein the metal layer includes aluminum, and wherein the interior layer includes one or both of a polyolefin and a polypropylene.

18. The method according to claim 9, wherein the laminate film includes a first adhesive layer between the exterior layer and the metal layer and a second adhesive layer between the metal layer and the interior layer.

19. The method according to claim 9, wherein a thickness of at least one side of the interior layer in the edge portion is from 20 μm to 40 μm.

* * * * *